United States Patent
Nourbakhsh et al.

(10) Patent No.: US 7,788,286 B2
(45) Date of Patent: *Aug. 31, 2010

(54) METHOD AND APPARATUS FOR MULTI-CONTACT SCHEDULING

(75) Inventors: Illah Nourbakhsh, Pittsburgh, PA (US); Ofer Matan, Palo Alto, CA (US); Jason Fama, Mountain View, CA (US); Scott Veach, Los Angeles, CA (US); Edward Hamilton, Los Gatos, CA (US); Alex Fukunaga, Rancho Palos Verdes, CA (US)

(73) Assignee: Verint Americas Inc., Melville, NY (US)

( * ) Notice: Subject to any disclaimer, the term of this patent is extended or adjusted under 35 U.S.C. 154(b) by 360 days.

This patent is subject to a terminal disclaimer.

(21) Appl. No.: 11/037,604

(22) Filed: Jan. 18, 2005

(65) Prior Publication Data
US 2005/0125439 A1   Jun. 9, 2005

Related U.S. Application Data

(63) Continuation of application No. 09/846,016, filed on Apr. 30, 2001, now Pat. No. 6,952,732.

(51) Int. Cl.
*G06F 7/00* (2006.01)
*G06F 17/00* (2006.01)
(52) U.S. Cl. ................................... 707/802
(58) Field of Classification Search ............ 379/266.02, 379/265.13; 705/9; 707/102, 103 R, 802, 707/803
See application file for complete search history.

(56) References Cited

U.S. PATENT DOCUMENTS

| | | | |
|---|---|---|---|
| 3,594,919 | A | 7/1971 | De Bell et al. |
| 3,705,271 | A | 12/1972 | De Bell et al. |
| 4,510,351 | A | 4/1985 | Costello et al. |
| 4,684,349 | A | 8/1987 | Ferguson et al. |

(Continued)

FOREIGN PATENT DOCUMENTS

EP   0453128 A2   10/1991

(Continued)

OTHER PUBLICATIONS

Irish, Chris, "Web-Enabled Call Centre", BT Technol. J., vol. 18, No. 2, Apr. 2000, pp. 65-71.*

(Continued)

*Primary Examiner*—Robert Stevens

(57) ABSTRACT

A method and apparatus for generating an agent schedule for a multi-contact center that has immediate queues and deferred queues. In one embodiment, a method includes scheduling software receiving a plurality of scheduling data from a user interface, and the scheduling software generating a plurality of scheduling constraints. The method further includes a search engine using the plurality of scheduling constraints to generate a plurality of potential schedules including first potential schedules for immediate queues, and second potential schedules for deferred queues. The method further includes performing a first analysis on the first potential schedules to generate first estimated service levels, and performing a second analysis on the second potential schedules to generate second estimated service levels, wherein the first estimated service levels and the second estimated service levels are expressed in interchangeable units.

20 Claims, 4 Drawing Sheets

U.S. PATENT DOCUMENTS

| | | | |
|---|---|---|---|
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,111,391 A | 5/1992 | Fields et al. | 364/401 |
| 5,117,225 A | 5/1992 | Wang | |
| 5,185,780 A * | 2/1993 | Leggett | 379/265.08 |
| 5,195,172 A | 3/1993 | Elad et al. | 395/50 |
| 5,210,789 A | 5/1993 | Jeffus et al. | |
| 5,239,460 A | 8/1993 | LaRoche | |
| 5,241,625 A | 8/1993 | Epard et al. | |
| 5,267,865 A | 12/1993 | Lee et al. | |
| 5,289,368 A | 2/1994 | Jordan et al. | 364/401 |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,325,292 A | 6/1994 | Crockett | 364/401 |
| 5,347,306 A | 9/1994 | Nitta | |
| 5,369,570 A | 11/1994 | Parad | 364/401 |
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,477,447 A | 12/1995 | Luciw et al. | 364/419.08 |
| 5,481,667 A | 1/1996 | Bieniek et al. | 395/161 |
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,594,790 A * | 1/1997 | Curreri et al. | 379/266.07 |
| 5,597,312 A | 1/1997 | Bloom et al. | |
| 5,619,183 A | 4/1997 | Ziegra et al. | |
| 5,659,768 A | 8/1997 | Forbes et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,822,400 A * | 10/1998 | Smith | 379/32.02 |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,917,485 A | 6/1999 | Spellman et al. | 345/336 |
| 5,918,214 A | 6/1999 | Perkowski | |
| 5,923,746 A | 7/1999 | Baker et al. | |
| 5,930,764 A * | 7/1999 | Melchione et al. | 705/10 |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,963,635 A * | 10/1999 | Szlam et al. | 379/309 |
| 5,964,836 A | 10/1999 | Rowe et al. | |
| 5,966,695 A * | 10/1999 | Melchione et al. | 705/10 |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,021,403 A | 2/2000 | Horvitz et al. | 706/45 |
| 6,021,428 A | 2/2000 | Miloslavsky | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,044,355 A * | 3/2000 | Crockett et al. | 705/8 |
| 6,057,841 A | 5/2000 | Thurlow et al. | |
| 6,058,163 A | 5/2000 | Pattison et al. | |
| 6,061,798 A | 5/2000 | Coley et al. | |
| 6,064,973 A * | 5/2000 | Smith et al. | 705/7 |
| 6,072,860 A | 6/2000 | Kek et al. | |
| 6,076,099 A | 6/2000 | Chen et al. | |
| 6,078,894 A | 6/2000 | Clawson et al. | |
| 6,081,592 A | 6/2000 | Battle | |
| 6,091,712 A | 7/2000 | Pope et al. | |
| 6,108,711 A | 8/2000 | Beck et al. | |
| 6,115,693 A * | 9/2000 | McDonough et al. | 705/10 |
| 6,122,665 A | 9/2000 | Bar et al. | |
| 6,122,668 A | 9/2000 | Teng et al. | |
| 6,130,668 A | 10/2000 | Stein | |
| 6,134,530 A * | 10/2000 | Bunting et al. | 705/7 |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Puram et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,389,132 B1 * | 5/2002 | Price | 379/265.01 |
| 6,404,857 B1 | 6/2002 | Blair et al. | |
| 6,411,989 B1 | 6/2002 | Anupam et al. | |
| 6,418,471 B1 | 7/2002 | Shelton et al. | |
| 6,449,646 B1 * | 9/2002 | Sikora et al. | 709/226 |
| 6,459,787 B2 | 10/2002 | McIlwaine et al. | |
| 6,487,195 B1 | 11/2002 | Choung et al. | |
| 6,493,446 B1 * | 12/2002 | Cherry | 379/265.05 |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazar | |
| 6,546,405 B2 | 4/2003 | Gupta et al. | |

| | | | |
|---|---|---|---|
| 6,560,328 | B1 | 5/2003 | Bondarenko et al. |
| 6,574,605 | B1* | 6/2003 | Sanders et al. .................. 705/8 |
| 6,581,105 | B2* | 6/2003 | Miloslavsky et al. ........ 709/238 |
| 6,583,806 | B2 | 6/2003 | Ludwig et al. |
| 6,584,191 | B1* | 6/2003 | McPartlan et al. ..... 379/265.02 |
| 6,606,657 | B1 | 8/2003 | Zilberstein et al. |
| 6,661,889 | B1* | 12/2003 | Flockhart et al. ....... 379/265.05 |
| 6,665,395 | B1* | 12/2003 | Busey et al. ........... 379/265.09 |
| 6,665,644 | B1 | 12/2003 | Kanevsky et al. |
| 6,674,447 | B1 | 1/2004 | Chiang et al. |
| 6,683,633 | B2 | 1/2004 | Holtzblatt et al. |
| 6,697,858 | B1 | 2/2004 | Ezerzer et al. |
| 6,724,887 | B1 | 4/2004 | Eilbacher et al. |
| 6,738,456 | B2 | 5/2004 | Wrona et al. |
| 6,744,877 | B1* | 6/2004 | Edwards ................ 379/265.02 |
| 6,757,361 | B2 | 6/2004 | Blair et al. |
| 6,771,764 | B1* | 8/2004 | Dezonno ............... 379/265.02 |
| 6,772,396 | B1 | 8/2004 | Cronin et al. |
| 6,775,377 | B2 | 8/2004 | McIlwaine et al. |
| 6,792,575 | B1 | 9/2004 | Samaniego et al. |
| 6,810,414 | B1 | 10/2004 | Brittain |
| 6,820,083 | B1 | 11/2004 | Nagy et al. |
| 6,823,384 | B1 | 11/2004 | Wilson et al. |
| 6,870,916 | B2 | 3/2005 | Henrikson et al. |
| 6,901,438 | B1 | 5/2005 | Davis et al. |
| 6,952,732 | B2* | 10/2005 | Nourbakhsh et al. ........ 709/226 |
| 6,959,078 | B1 | 10/2005 | Eilbacher et al. |
| 6,965,886 | B2 | 11/2005 | Govrin et al. |
| 6,970,829 | B1* | 11/2005 | Leamon .......................... 705/9 |
| 7,092,509 | B1* | 8/2006 | Mears et al. ........... 379/266.01 |
| 7,155,399 | B2* | 12/2006 | Andre et al. .................... 705/9 |
| 7,158,629 | B2* | 1/2007 | Rodenbusch et al. ... 379/266.07 |
| 2001/0000962 | A1 | 5/2001 | Rajan |
| 2001/0032335 | A1 | 10/2001 | Jones |
| 2001/0043697 | A1 | 11/2001 | Cox et al. |
| 2002/0038363 | A1 | 3/2002 | MacLean |
| 2002/0052948 | A1 | 5/2002 | Baudu et al. |
| 2002/0065911 | A1 | 5/2002 | Von Klopp et al. |
| 2002/0065912 | A1 | 5/2002 | Catchpole et al. |
| 2002/0067820 | A1* | 6/2002 | Benson et al. ......... 379/265.02 |
| 2002/0128925 | A1 | 9/2002 | Angeles |
| 2002/0143597 | A1* | 10/2002 | Andre et al. .................... 705/9 |
| 2002/0143925 | A1 | 10/2002 | Pricer et al. |
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2005/0138560 | A1 | 6/2005 | Lee et al. |

FOREIGN PATENT DOCUMENTS

| | | |
|---|---|---|
| EP | 0773687 A2 | 5/1997 |
| EP | 0 817 455 A2 | 1/1998 |
| EP | 0 863 650 A2 | 9/1998 |
| EP | 0 863 651 A2 | 9/1998 |
| EP | 0989720 | 3/2000 |
| EP | 1 039 732 A2 | 9/2000 |
| EP | 1 162 814 A2 | 12/2001 |
| GB | 2 339 643 A | 2/2000 |
| GB | 2369263 | 5/2002 |
| WO | WO 98/43380 | 11/1998 |
| WO | WO 00/08556 | 2/2000 |
| WO | WO 00/08556 A1 | 2/2000 |
| WO | WO 00/16207 | 3/2000 |

OTHER PUBLICATIONS

"Customer Spotlight: Navistar International," Web page, Apr. 1, 2002, 2 pages.
"DKSystems Integrates QM Perception with OnTrack for Training," Web page, Apr. 1, 2002, 3 pages.
"OnTrack Online" Delivers New Web Functionality, Web page, Apr. 2, 2002, 2 pages.
"PriceWaterouseCoopers Case Study" The Business Challenge, Web page, 2000, 2 pages.
Abstract, net.working: "An Online Webliography," *Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. (May/Jun. 1998), 1 page.
Beck et al., "Applications of AI in Education," *AMC Crossroads* vol. 1: 1-13 (Fall 1996) Web page, Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," Web page, Apr. 11, 2007, 52 pages.
Blumenthal et al., "Reducong Development Costs with Intelligent Tutoring System Shells," Web page, Apr. 9, 2002, 10 pages.
Brusilosy et al., "Distributed intelligent tutoring on the Web," Proceedings of the $8^{th}$ World Conference of the AIED Society, Kobe, Japan, Aug. 18-22, pp. 1-9 Web page, Apr. 12, 2002.
Brusilovsky and Pesin, ISIS-Tutor: An intelligent Learning Environment for CD/ISIS Users, pp. 1-15 Web page, May 2, 2002.
Brusilovsky, "Adaptive Educational Systems on the World-Wide-Web: A Review of Available Technologies," pp. 1-10, Web Page, Apr. 12, 2002.
Byrnes et al., "The Development of a Multiple-Choice and True-False Testing Environment on the Web," pp. 1-8, Web page, Apr. 12, 2002.
Calvi and DeBra, "Improving the Usability of Hypertext Courseware through Adaptive Linking," *ACM*, (1997), 2 pages.
Coffey, "Are Performance Objectives Really Necessary?" *Technical Skills and Training* pp. 25-27 (Oct. 1995).
Cohen, "Knowledge Management's Killer App," pp. 1-11, Web page, Sep. 12, 2002.
Cole-Gomolski, "New Ways to manage E-Classes," *Computerworld* vol. 32, No. 48 (Nov. 30, 1998), 1 page.
Cross: "Sun Microsystems—the SunTAN Story," Internet Time Group 8 (© 2001), 5 pages.
Cybulski and Linden, "Teaching Systems Analysis and Design Using Multimedia and Patterns," 10 pages, Apr. 11, 2007.
De Bra et al., "Adaptive Hypermedia: From Systems to Framework," *ACM* (2000), 6 pages.
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and JCAL," *Computers Educational* 22(1/2) (1994), 3 pages.
Dyreson, "An Experiment in Class Management Using the World Wide Web," pp. 1-12, Web page, Apr. 12, 2002.
E Learning Community, "Excellence in Practice Award: Electronic Learning Technologies," *Personal Learning Network* pp. 1-11, Web page, Apr. 12, 2002.
Eklund and Brusilovsky, "The Value of Adaptivity in Hypermedia Learning Environments: A Short Review of Empirical Evidence," pp. 1-8, Web page, May 2, 2002.
*e-Learning the future of learning*, THINQ Limited, London, Version 1.0 (2000), 35 pages.
Eline, "A Trainer's Guide to Skill Building," *Technical Training* (Sep./Oct. 1998), 4 pages.
Eline, "Case Study: Briding the Gap in Canada's IT Skills," *Technical Skills and Training* pp. 23-25 (Jul. 1997).
Eline "Case Study: IBT's Place in the Sun," *Technical Training* (Aug./Sep. 1997), 5 pages.

Fritz, "CB templates for productivity: Authoring system templates for trainers," *Emedia Professional* 10(8): (Aug. 1997), 8 pages.
Fritz, "ToolBook II: Asymetrix's updated authoring software tackles the Web," *Emedia Professional* 10(20): (Feb. 1997), 4 pages.
Gibson et al., "A Comparative Analysis of Web-Based Testing and Evaluation Systems," pp. 1-18, Web page, Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, Mar. 20, 2002.
Klein, "Command Decision Training SupportTechnology," Web page, Apr. 12, 2002, 1 page.
Koonce, "Where Technology and Training Meet," *Technical Training* (Nov./Dec. 1998), 2.
Kursh, "Going the distance with Web-based training," *Training and Development* 52(3): (Mar. 1998), 3 pages.
Larson, "Enhancing Performance Through Customized Online Learning Support," *Technical Skills and Training* pp. (May/Jun. 1997), 4 pages.
Linton, et al. "OWL: A Recommender System for Organization-Wide Learning," *Educational Technical Society* 3(1):62-76 (2000).
Lucadamo and Cheney, "Best Practices in Technical Training," *Technical Training* (Oct. 1997), 4 pages.
McNamara, "Monitoring Solutions: Quality Must be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Learning a Reading Tutor that Listens" *American Association for Artificial Intelligence*, Web page, Aug. 1997, 7 pages.
Mullier et al., "A Web base Intelligent Tutoring System," pp. 1-6, Web page, May 2, 2002.
Nash, Database Marketing, 1993, McGraw Hill, Inc. USA, 13 pages.
Nelson et al. "The Assessment of *End-User Training Needs*," *Communications ACM* 38(7):27-39 (Jul. 1995).
O'Herron, "CenterForce Technologies CenterForce Analyzer," Web page Mar. 2, 2002, 1 page.
O'Roark, "Basic Skills Get a Boost," *Technical Training* pp. 10-13 (Jul./Aug. 1998).
Pamphlet, On Evaluating Educational Innovations', authored by Alan Lesgold, Mar. 5, 1998, 36 pages.
Papa et al., "A Differential Diagnostic Skills Assessment and Tutorial Tool," *Computer Education* 18(1-3):45-50 (1992).
PCT International Search Report, International Application No. PCT/US03/02541, May 12, 2003, 5 pages.
Phaup, "New Software Puts Computerized Tests on the Internet: Presence Corporation announces breakthrough Question Mark™ Web Product," Web page, Apr. 1, 2002, 1 page.
Phaup, "QM Perception™ Links with Integrity Training's WBT Manager™ to Provide Enhanced Assessments of Web-Based Courses," Web page, Apr. 1, 2002, 2 pages.
Phaup, "Question Mark Introduces Access Export Software," Web page, Apr. 2, 2002, 1 page.
Phaup, "Question Mark Offers Instant Online Feedback for Web Quizzes and Questionnaires: University of California assist with Beta Testing, Server scripts now available on high-volume users," Web page, Apr. 1, 2002, 2 pages.
Piskurich, Now-You-See-'Em, Now-You-Don't Learning Centers, *Technical Training* pp. 18-21 (Jan./Feb. 1999).

Read, "Sharpening Agents' Skills," pp. 1-15, Web page, Mar. 20, 2002.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, Mar. 20, 2002, 2 pages.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998), 2 pages.
"Long-distance learning," *InfoWorld* 20(36):7676 (1998), 2 pages.
$10^{th}$ Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQuality to Business", 2 pages, Apr. 11, 2007.
Witness Systems promotional brochure for eQuality entitled "Building Customer Loyalty Through BusinessDriven Recording of Multimedia Interactions in your Contact Center," (2000), 5 pages.
Aspect Call Center Product Specification, "Release 2.0", Aspect Telecommunications Corporation, May 23, 1998, 6 pages.
Metheus X Window Record and Playback, XRP Features and Benefits, 2 pages Sep. 1994.
"Keeping an Eye on Your Agents," Call Center Magazine, pp. 32-34, Feb. 1993.
Anderson: Interactive TV's New Approach, The Standard, Oct. 1, 1999, 5 pages.
Ante, *Everything You Ever Wanted to Know About Cryptography Legislation . . . (But Were to Sensible to Ask)*, PC world Online, Dec. 14, 1999, 3 pages.
Berst, *It's Baa-aack. How Interative TV is Sneaking Into Your Living Room*, The AnchorDesk, May 10, 1999, 3 pages.
Berst, *Why Interactive TV Won't Turn You On (Yet)*, The AnchorDesk, Jul. 13, 1999, 2 pages.
Borland and Davis, *US West Plans Web Services on TV*, CNETNews.com, Nov. 22, 1999, 3 pages.
Brown, *Let PC Technology Be Your TV Guide*, PC Magazine, Jun. 7, 1999, 2 pages.
Brown, *Interactive TV: The Sequel*, NewMedia, Feb. 10, 1998, 23 pages.
Cline, Déjà vu—*Will Interactive TV Make It This Time Around?*, DevHead, Jul. 9, 1999, 1 page.
Crouch, *TV Channels on the Web*, PC World, Sep. 15, 1999, 2 pages.
D'Amico, *Interactive TV Gets $99 set-top box*, IDG.net, Oct. 6, 1999, 2 pages.
Davis, *Satellite Systems Gear Up for Interactive TV Fight*, CNETNews.com, Sep. 30, 1999, 3 pages.
Diederich, *Web TV Data Gathering Raises Privacy Concerns*, ComputerWorld, Oct. 13, 1998, 3 pages.
*Digital Broadcasting*, Interactive TV News, 10 pages, Apr. 11, 2007.
*EchoStar, MediaX Mix Multimedia With Interactive Television*, PRNews Wire, Jan. 11, 1999, 2 pages.
Furger, *The Internet Meets the Couch Potato*, PCWorld, Oct. 1996, 5 pages.
*Hong Kong Comes First with Interactive TV*, SCI-TECH, Dec. 4, 1997, 4 pages.
*Interactive TV Overview TimeLine*, Interactive TV News, Apr. 11, 2007, 9 pages.
*Interactive TV Wars Heat Up*, Industry Standard, Apr. 11, 2007, 2 pages.
Needle, *Will The Net Kill Network TV?* PC World Online, Mar. 10, 1999, 2 pages.
Kane, *AOL-Tivo: You've Got Interactive TV*, ZDNN, Aug. 17, 1999, 2 pages.

Kay, *E-Mail in Your Kitchen*, PC World Online, 093/28/96, 3 pages.
Kenny, *TV Meets Internet*, PC World Online, Mar. 28, 1996, 1 page.
Linderholm, *Avatar Debuts Home Theater PC*, PC World Online, Dec. 1, 1999, 2 pages.
Mendoza, *Order Pizza While You Watch*, ABCNews.com, Apr. 11, 2007, 3 pages.
Moody, *WebTV: What the Big Deal?*, ABCNews.com, Apr. 11, 2007, 3 pages.
Mundorf et al., *Interactive Television—Is There Life After the Internet?*, Interactive TV News, Apr. 11, 2007, 10 pages.
Needle, *PC, TV or Both?*, PC World Online, Apr. 11, 2007, pages.
*Interview with Steve Perlman*, CEO of Web-TV Networks, PC World Online, Apr. 11, 2007, 3 pages.
Press, *Two Cultures, The Internet and Interactive TV*, Universite de Montreal, 11 pages, Apr. 11, 2007.
Reuters, *Will TV Take Over Your PC?*, PC World Online, 1 page, Apr. 11, 2007.
Rohde, *Gates Touts Interactive TV*, InfoWorld, Oct. 14, 1999, 2 pages.
Ross, *Broadcasters Use TV Signals to Send Data*, PC World Oct. 1996, 1 page.
Schlisserman, *Is Web TV a Lethal Weapon?*, PC World Online, 1 page, Apr. 11, 2007.
Stewart, *Interactive Television at Home: Television Meets the Internet*, Aug. 1998, 23 pages.
Swedlow, *Computer TV Shows: Ready for Prime Time?*, PC World Online, 2 pages, Apr. 11, 2007.
Wilson, *U.S. West Revisits Interactive TV*, Interactive Week, Nov. 28, 1999, 1 page.
Dennis Cox; "Handling Multi-Media Work"; A Pipkins White Paper; www.pipkins.com; Mar. 12, 2001; pp. 1-3.
Pipkins, Inc.; SkillSense™ Scheduling; www.pipkins.com; Mar. 12, 2001; pp. 1-2.
Pipkins, Inc.; Merlang® Algorithms; www.pipkins.com; Mar. 12, 2001; pp. 1-2.
Dennis Cox; Skill Based Routing vs. Skill Set Scheduling; A Pipkins White Paper; www.pipkins.com; Mar. 12, 2001; pp. 1-6.
Pipkins, Inc.; "Skill Set Scheduling"; www.pipkins.com; Mar. 12, 2001; pp. 1-4.
Institute of Electronic et al: "Performance modelling of automatic call distributors: assignable grade of service staffing". Proceedings of the International Switching Symposium. Yokohama, Oct. 25-30, 1992, Tokyo, IEICE, JP, vol. 2 Symp. 14, Oct. 25, 1992, pp. 294-298 XP000337733.
Jackson et al: "Queues with dynamic priority discipline". Management Science, Institue of Management Science, Providence, RI, US. vol. 8 No. 1, 1961, pp. 18-34. XP002091801. ISSN: 0025-1909.
Kleinrock et al: "Queueing systems vol. 55-68 II: computer applications". Queueing Systems, J.C. Baltzer AG, Basel, CH, 1976, pp. 106-155. XP002091802. ISSN: 0257-0130.

\* cited by examiner

METHOD AND APPARATUS FOR MULTI-CONTACT SCHEDULING

This application is a continuation of application Ser. No. 09/846,016, filed Apr. 30, 2001, now U.S. Pat. No. 6,952,732 which is hereby incorporated by reference in its entirety.

FIELD OF THE INVENTION

The invention is in the field of generating complex schedules in dynamic environments, such as multi-contact centers.

BACKGROUND

Generating schedules for employees is a complex problem for enterprises. Telephone call center scheduling is an example of a scheduling problem with a large number of variables. Variables include contact volume at a particular time of day, available staff, skills of various staff members, call type (e.g., new order call and customer service call), and number of call queues, where a queue may be assigned a particular call type. A basic goal of call center scheduling is to minimize the cost of operators, or agents, available to answer calls while maximizing service. Quality of service, or service level, can be quantified in various ways. One common metric for call service level is the percentage of incoming calls answered in a predetermined time, e.g. thirty seconds. The call center may receive calls of various types that are assigned to respective call queues.

Traditionally, call center scheduling is performed by first forecasting incoming contact volumes and estimating average talk times for each time period t (based on past history and other measures). The forecast is based upon historical data. Next, a closed-form formula known as reverse Erlang-C is used to compute full-time equivalent (FTE) agent requirement to provide a desired service level for each time period t. Such a method is described in Elementary Queuing Theory and Telephone Traffic, by Petr Beckmann, 1977, and in Lee's ABC of the Telephone Training Manuals, Geneva, Ill. After the FTE agent requirement are computed, the required number of agents is scheduled for each time period t.

At a call center, calls of different types are typically placed onto different queues by an Automatic Call Distributor (ACD). The calls wait at the ACD for an operator to answer them. The ACD is typically for handling telephone calls. Different types of calls are assigned to different call queues. Typically, not all agents have the same skills, and thus some agents can answer some calls while other agents cannot. Scheduling for varying agent skill sets is the skill-based scheduling problem. The skill-based scheduling problem is considerably more difficult than the basic call center scheduling problem because of all the interactions between queues. Typical approaches to solving the skill-based scheduling problem involve variations on an Erlang formula. The Erlang formulas are useful for computing staffing requirements for telephone contacts where the average contact volume is high, service level requirements are stringent, the task of answering a telephone call is not interruptible, and an agent can only answer one telephone call at a given time. Service level is expressed as a percentage of incoming calls that can be answered in within a maximum time limit. An example of stringent service levels is 80%-90% of incoming calls to be answered within 20-60 seconds.

In the past few years, however, call centers have evolved into "contact centers" in which the agent's contact with the customer can be through many contact media. For example, a multi-contact call center may handle telephone, email, web callback, web chat, fax, and voice over internet protocol (IP). Therefore, in addition to variation in the types of calls (e.g., service call, order call), modern contact centers have the complication of variation in contact media. The variation in contact media adds complexity to the agent scheduling process. For example, one of the ways in which contact media can vary markedly is in time allowed for response to the contact. Telephone calls are typically expected to be answered when they are received, or in "real-time". If a caller does not receive a real-time answer in a fairly short time, the caller hangs up, abandoning the call. If a contact is by email or fax, on the other hand, the customer does not expect a real-time response. Therefore response times for various contact media vary from seconds to days.

Call centers have traditionally had to respond immediately to their telephone customers, and therefore the incoming telephone call queues are called on-line queues. In multi-contact call centers, however, an agent may be required to respond to incoming customer contacts from other queues, such as e-mail and faxed requests, in addition to responding to customer contacts from "immediate" queues, such as telephone calls and computer chats. Email and fax contact do not require immediate responses, but can be deferred. As with traditional telephone call centers, agents can only answer the types of calls for which they have the appropriate training and/or experience. Because all agents must be scheduled across immediate and deferred queues, in addition to all of the traditional scheduling constraints, the multi-contact scheduling problem is considerably complex.

Common techniques for scheduling staff in contact centers that have both immediate and deferred queues are inadequate. For example, in typical scheduling techniques, immediate queues are dealt with in terms of immediate performance measures such as average time to answer and service level. Deferred queues are considered only secondarily. Deferred queues are often simply scheduled into the day during lulls in on-line queue demand. No consideration is given to a projected or expected performance of deferred queues.

There are currently no known methods for effectively computing staffing requirements for e-mail, chat, Web callback, and other new media given certain service level requirements and contact arrival rates. Erlang formulas cannot be used because off-line contact media do not conform to Erlang's queuing theory models. Some of the aspects of deferred contacts that do not conform with Erlang models include the interruptibility of tasks, the fact that multiple contacts may be handled simultaneously, and the fact that service levels can be in hours or days, rather than seconds. This limits the effectiveness of the multi-contact center because there is no common performance measure for immediate and deferred queues, and thus no way to assess possible trade-offs between assigning agents to immediate queues versus deferred e queues. Another disadvantage of current scheduling methods that a call center manager cannot visualize queue performance in a type-independent manner and therefore must make adjustments to the schedule without the benefit of data to direct the adjustments.

SUMMARY OF THE DISCLOSURE

A method and apparatus for multi-contact scheduling is described. Embodiments of the invention can be used with existing scheduling software to produce agent schedules for contact centers that handle on-line "immediate" and off-line "deferred" contact queues. One embodiment includes scheduling software receiving a scheduling data from a user interface, and the scheduling software generating scheduling constraints. A search engine uses the scheduling constraints to generate potential schedules, including potential schedules for immediate queues, and potential schedules for deferred queues. An analysis is performed on the potential schedules for the immediate queues. The analysis for the immediate queues can be preformed using existing analysis tools. In addition, an analysis is performed on the potential schedules for the deferred queues. The analyses produce estimated service levels expressed in interchangeable units. The immediate and deferred queues can thus be commonly assessed, allowing the choice of a schedule that is optimized both for immediate queues and deferred queues.

DETAILED DESCRIPTION

A method and apparatus for multi-contact scheduling is described. Embodiments of the invention allow scheduling of immediate contact queues and deferred contact queues for a contact center. Potential agent schedules are analyzed and estimated service levels are generated for both immediate queues and deferred queues in common units. An optimized schedule that takes into account all types of contacts can thus be generated.

Figure 1:
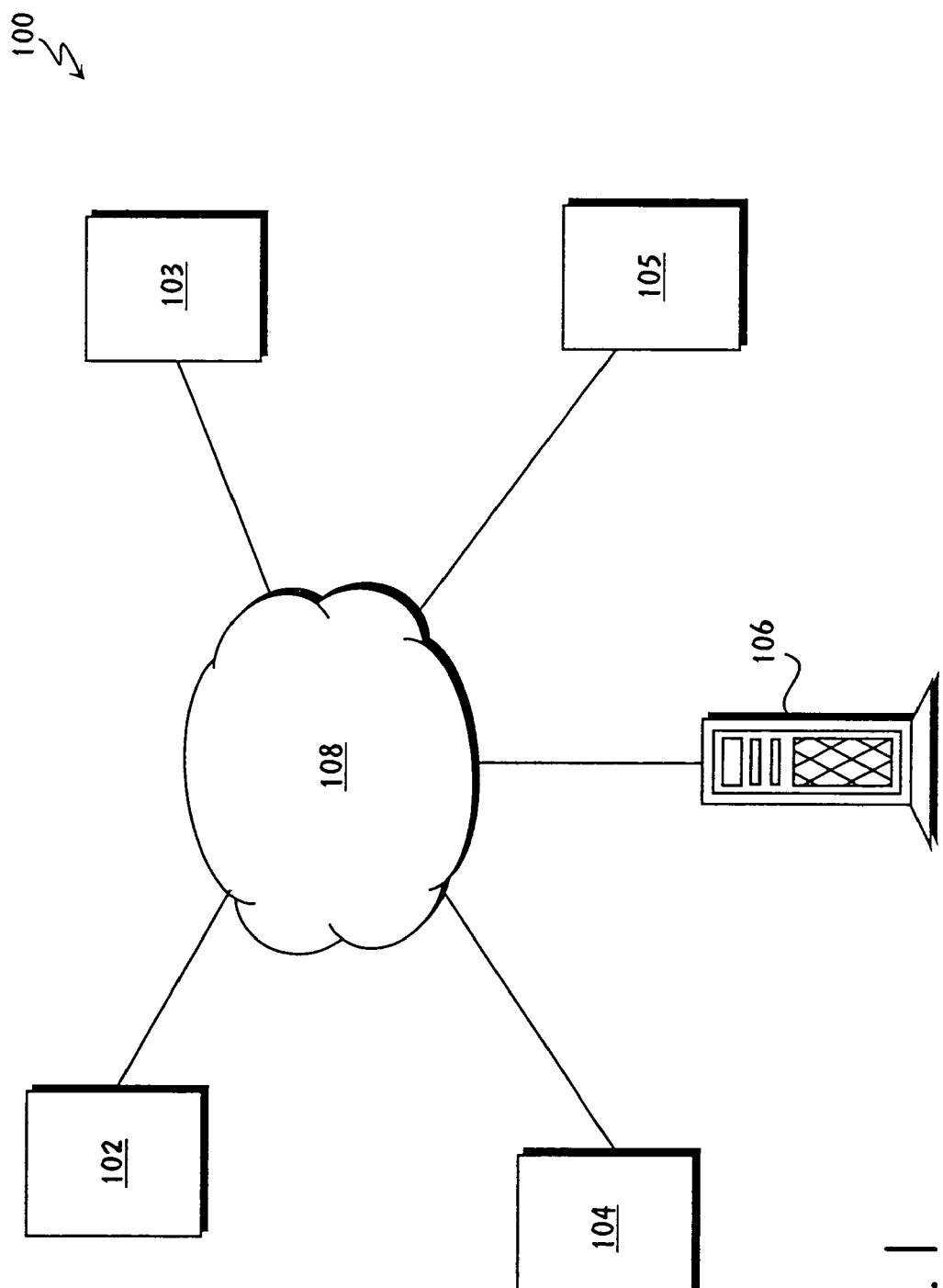
FIG. 1 is a block diagram of an embodiment of a system for multi-contact schedule generation.

FIG. 1 is an embodiment of a system 100 for generating complex schedules. The system includes multiple client computers 102-105, which are coupled to the server 106 through a network 108. The network 108 can be any network, such as a local area network, a wide area network, or the Internet. The client computers each include one or more processors and one or more storage devices. Each of the client computers also includes a display device, and one or more input devices. The server 106 includes one or more storage devices. All of the storage devices store various data and software programs. In one embodiment, methods for generating complex schedules are carried out on the system 100 by software instructions executing on one or more of the client computers 102-105. The software instructions may be stored on the server 106 or on any one of the client computers. For example, one embodiment is a hosted application used by a call center of an enterprise that requires complex scheduling of many employees, or agents. The software instructions are stored on the server and accessed through the network by a client computer operated by the enterprise. In other embodiments, the software instructions may be stored and executed on the client computer. Data required for the execution of the software instructions can be entered by a user of the client computer through a specialized user interface. Data required for the execution of the software instructions can also be accessed via the network and can be stored anywhere on the network.

One example of a complex schedule is an agent schedule for a multi-contact center, or contact center. A contact center is an organization that responds to incoming contacts from customers of an enterprise. The incoming contacts are via any one of a number of contact media, such as telephone calls, email, fax, web chat, voice over internet protocol, and call backs. An agent is an employee that is trained to respond to various contacts according to both the content and the medium of the contact. Each agent can have a different skill set. For example, one agent may be trained to answer live telephone help inquiries regarding certain products, respond to email regarding certain products, receive telephone purchase orders for certain products, etc. Typically, incoming contacts are assigned to different queues based upon the content and/or medium of the contact. In embodiments of the invention, contact queues are divided into at least two types of queues. One type of queue is an immediate queue for contacts that can be abandoned and should be responded to in real-time, such as telephone calls. Another type of queue is a deferred queue for contacts that cannot be abandoned (at least not immediately) and should be responded to within some time period after receipt, such as email or fax.

An agent may be assigned to multiple contact queues within a time period. A contact queue typically handles one type of contact requiring a particular skill or skills. The possible number of skill sets includes every permutation of combinations of the existing skills in the organization. Each agent has a particular skill set, but the skill sets among different agents may overlap. In embodiments of the invention, as described more fully below, a user who is performing scheduling can produce a schedule that most efficiently uses available agents across contact media, taking into account the widely varying acceptable response times of different contact media. For example, telephone calls must be responded to in seconds, while fax contacts may be responded to in some number of days.

Traditionally there are two important measures for immediate queue performance. One measure is percentage of calls answered, or PCA, which represents the service level provided by the queue. The other measure is based upon the number of agents servicing a queue (agents available) and the number of agents required on the queue (agents required) in order to meet service level goals. Embodiments of the invention estimate values of PCA, agents available, and agents required for deferred queues using discrete mathematical analysis as further described below. Any other performance measures may be used in various embodiments, such as average speed to answer. Embodiments of the invention present the performance measures for immediate and deferred queues in an identical way, which facilitates visualization of potential schedules and human decision-making.

Figure 2:
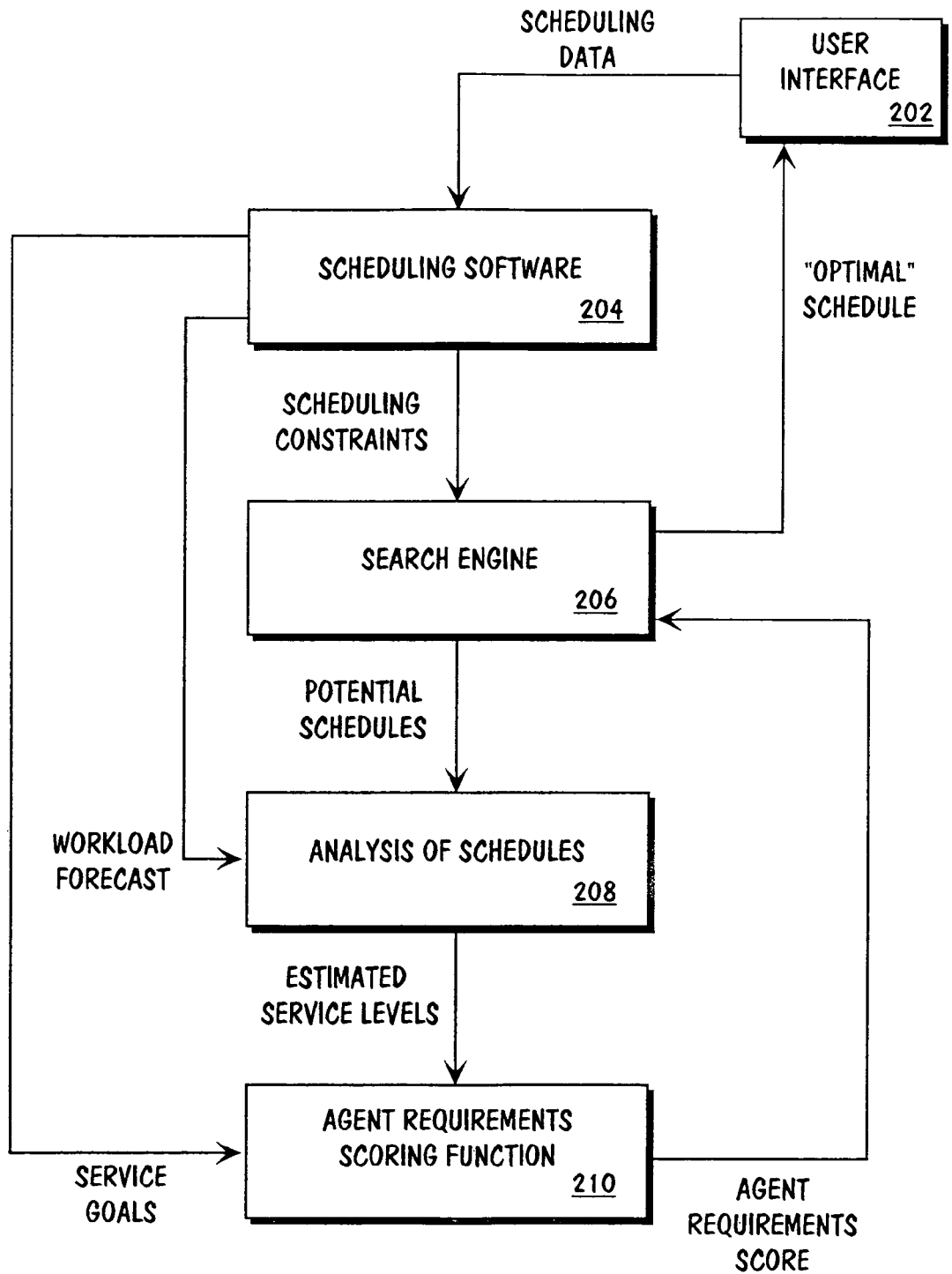
FIG. 2 is a simplified flow diagram of an embodiment of schedule generation, including an a schedule analysis adapted to deferred queues.

FIG. 2 is a simplified flow diagram of an embodiment of schedule generation that is capable of analyzing deferred queue performance and representing that performance using the same measures traditionally used for immediate queues. At 202, a user enters scheduling data via a user interface that is specifically designed for the agent scheduling process. The scheduling data applies to a schedule period that includes multiple intervals of predetermined length. For example, the scheduling period can be one day with intervals of one half-hour. The scheduling data includes the type of contact media, the expected contact volume, the expected contact handle times, service goals, agent designations, and work rules. Some of the data, such as expected contact handle times, is derived from historical data. In one embodiment, the scheduling data includes data for deferred queues. In other embodiments, the scheduling data includes data for immediate and deferred queues.

At 204, scheduling software receives the scheduling data. The scheduling software is an existing tool for analyzing the scheduling data and generating scheduling constraints, including workload forecasts and service goals. The scheduling constraints are sent to a search engine at 206. The search engine generates potential schedules for analysis. At 208, analysis of schedules for deferred queues is performed to produce estimated service levels for the deferred queues according to the potential schedule that was analyzed. The analysis of 208 is performed using a forward-push discrete event modeler which estimates PCA for deferred queues given the workload and capacity in any given interval within the schedule period. PCA for deferred queues is used by the agent requirement scoring function at 210, along with service goals, to produce an agent requirement score. The analysis of 208 will be described more fully with reference to FIG. 4. The agent requirement score is used by the search engine 206 to evaluate the schedule. A schedule with the highest agent requirement score of all of the analyzed schedules is output as an "optimal" schedule to the user interface 202. The flow of FIG. 2 produces an optimal schedule, including optimal schedules for deferred queues as measured by traditional metrics used for immediate queues.

In another embodiment, which will now be described with reference to the flow diagram of FIG. 3, optimal schedules for both immediate and deferred queues are produced in one embodiment, and each type of queue is analyzed separately. One analysis is used for deferred queues, and another analysis is used for immediate queues. At 302, the user enters scheduling data via a user interface. The scheduling data is similar to that described with reference to FIG. 2. The scheduling data applies to both immediate queues and deferred queues. The scheduling software, at 304, uses the scheduling data to generate scheduling constraints, workload forecast for both immediate queues and deferred queues, and service goals for all queues. At 306, the search engine uses the scheduling constraints to generate potential schedules for both immediate queues and deferred queues. In one embodiment, a single schedule including both types of queues is received by the deferred queue analysis at 308, and by the immediate queue analysis at 310. The deferred queue analysis generates estimated service levels for queues as described with reference to FIG. 2. The immediate queue analysis generates estimated service levels according to conventional techniques such as Erlang-based analysis. The estimated service levels for the immediate queues and deferred queues are in the same or interchangeable units, so that both types of queues are scored together by the agent requirement scoring function at 312. This generates a score that reflects the effectiveness of the potential schedule in utilizing all of the available agents, with their varying skill sets, across different contact queues. An agent requirement score is received by the search engine 306, which designates an optimal schedule. In one embodiment, a schedule is evaluated for each queue in the schedule. For example, each queue will have potentially different agents available and agents required. If some of the queues are deferred, and some are immediate, the methods for calculating the agent requirements and agents available are different for the two types of queues. All of the agent requirements and agents available are combined into one score, however, so that the order or method of queue evaluation is irrelevant. The optimal schedule is the schedule with the best agent requirement score of all of the potential schedules analyzed. The optimal schedule is output to the user via the interface 302.

Figure 3:
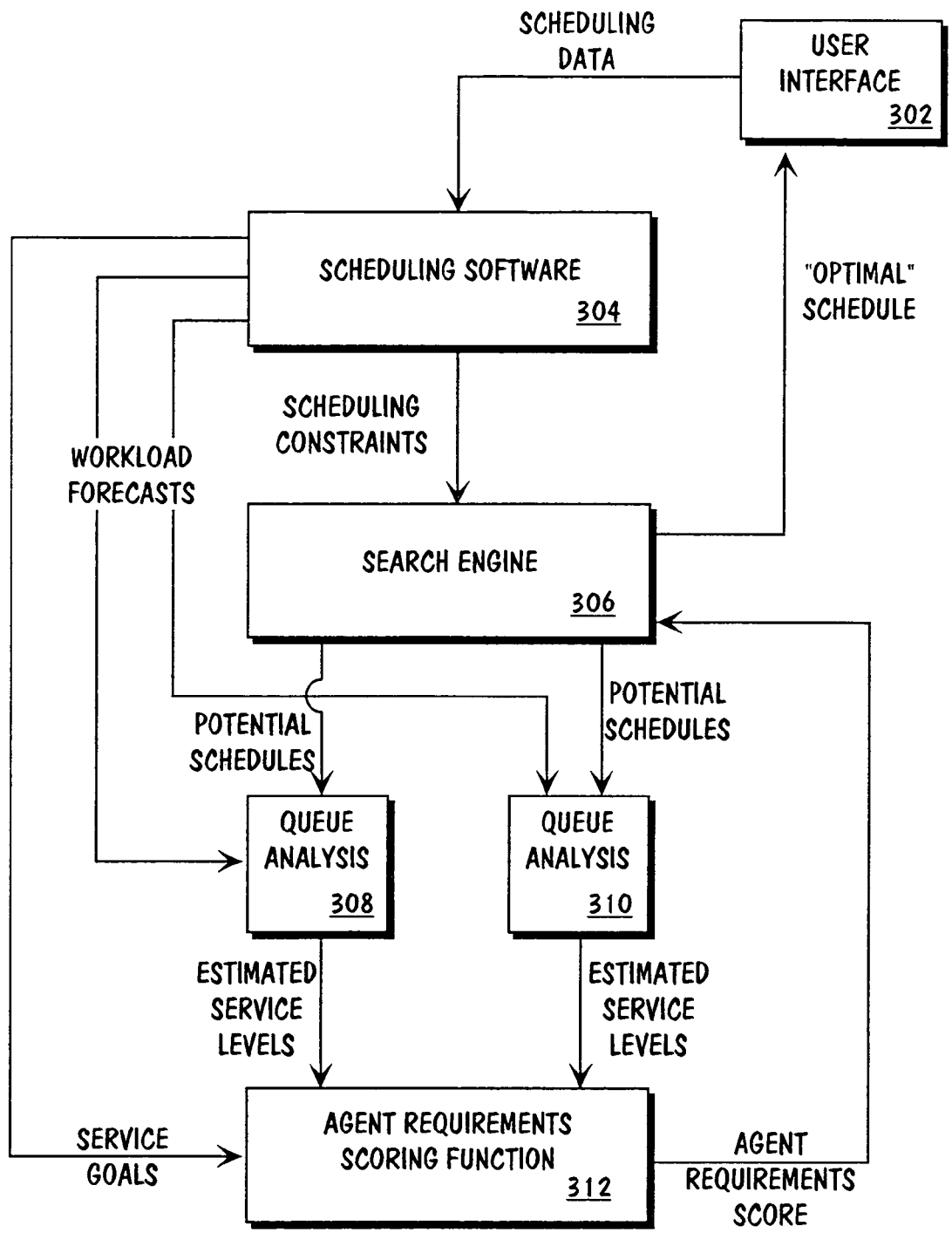
FIG. 3 is a simplified flow diagram of an embodiment of schedule generation for immediate and deferred queues.

In one embodiment, the queue analysis designated by 208 in FIG. 2 and by 308 in FIG. 3 is a forward push discrete event modeler. The forward push discrete event modeler will be described with reference to Table 1 through Table 3. In each interval, workload is computed by multiplying the forecast contact volume with the forecast average handling time. Capacity is computed by multiplying the number of available agents with the number of seconds in the interval in which they will work on a particular queue. If agents are capable of working on multiple queues in the same time interval, the time they spend on each of the queues is determined by static analysis or occasional explicit simulation of contact arrivals.

Referencing Table 1, the forward push modeler iterates over all intervals starting with the earliest interval and subtracts the capacity from the first interval's workload until all of the first interval's workload is completed. Next, the forward push modeler starts with the second earliest interval and subtracts the capacity from the second interval's workload until all of the second interval's workload is completed. This continues until all of the capacity is used or all of the workload is completed.

TABLE 1

| | Interval | | | | | |
|---|---|---|---|---|---|---|
| | 1 | 2 | 3 | 4 | 5 | 6 |
| Initially: | | | | | | |
| Workload | 100 | 100 | 100 | 0 | 0 | 0 |
| Capacity | 40 | 40 | 40 | 40 | 40 | 40 |
| After the 1$^{st}$ Iteration: | | | | | | |
| Workload | 0 | 100 | 100 | 0 | 0 | 0 |
| Capacity | 0 | 0 | 20 | 40 | 40 | 40 |
| After the 2nd Iteration: | | | | | | |
| Workload | 0 | 0 | 100 | 0 | 0 | 0 |
| Capacity | 0 | 0 | 0 | 0 | 0 | 40 |
| After the 3$^{rd}$. (Final) Iteration | | | | | | |
| Workload | 0 | 0 | 60 | 0 | 0 | 0 |
| Capacity | 0 | 0 | 0 | 0 | 0 | 0 |

Referencing Table 2, the forward push modeler returns an approximate percentage workload completed within that service time by evaluating the workload remaining (if any) once the number of intervals in the service goal time has elapsed. The percentage workload completed is interchangeable with the traditional measure of PCA, and will be referred to as PCA herein. In Table 2, the service goal time is two intervals. The average speed to answer (ASA) is computed by doing a weighted average of the amounts of workload completed in various intervals and the time elapsed. Interval 1 in Table 2 would have a PCA of 80% because 80 seconds of workload out of 100 seconds were completed within two intervals. In various embodiments, other performance measure than PCA can be determined.

TABLE 2

| Service Goal Time = 2 Intervals | | | | | | |
|---|---|---|---|---|---|---|
| | Interval (Initial) | | | | | |
| | 1 | 2 | 3 | 4 | 5 | 6 |
| Workload | 100 | 100 | 100 | 0 | 0 | 0 |
| Capacity (Remaining) | 40 | 40 | 40 | 40 | 40 | 40 |
| Workload | 0 | 0 | 60 | 0 | 0 | 0 |
| Capacity | 0 | 0 | 0 | 0 | 0 | 0 |
| PCA | 80% | 20% | 0% | — | — | — |

Agents available and agents required are computed from the results of the forward push modeler such that the trade-offs with immediate queues that typically have explicit agent requirement can be computed and compared. Agent requirement is calculated by multiplying the workload and the required service goal percentage. Agents available is calculated by multiplying the workload and the PCA and adding the remaining capacity, of there is any. If agent requirement is greater than agents available, then the contact center is understaffed. If agents available is greater than agent requirement, then the contact center is overstaffed. Put another way, PCA exceeds required service goal percentage, or there is unused capacity. With reference to Table 3, the example above, the required service goal percentage is 70 and the service goal time is two intervals. The agent requirement and agents available are shown for each interval in the schedule period.

TABLE 3

Required Service Goal Percent = 70%
Service Goal Time = 2 Intervals

| | Interval (Initial) | | | | | |
|---|---|---|---|---|---|---|
| | 1 | 2 | 3 | 4 | 5 | 6 |
| Workload | 100 | 100 | 100 | 0 | 0 | 0 |
| Capacity (Remaining) | 40 | 40 | 40 | 40 | 40 | 40 |
| Workload | 0 | 0 | 60 | 0 | 0 | 0 |
| Capacity | 0 | 0 | 0 | 0 | 0 | 0 |
| PCA | 80% | 20% | 0% | — | — | — |
| Required | 70 | 70 | 70 | 0 | 0 | 0 |
| Available | 80 | 20 | 0 | — | — | — |

Figure 4:
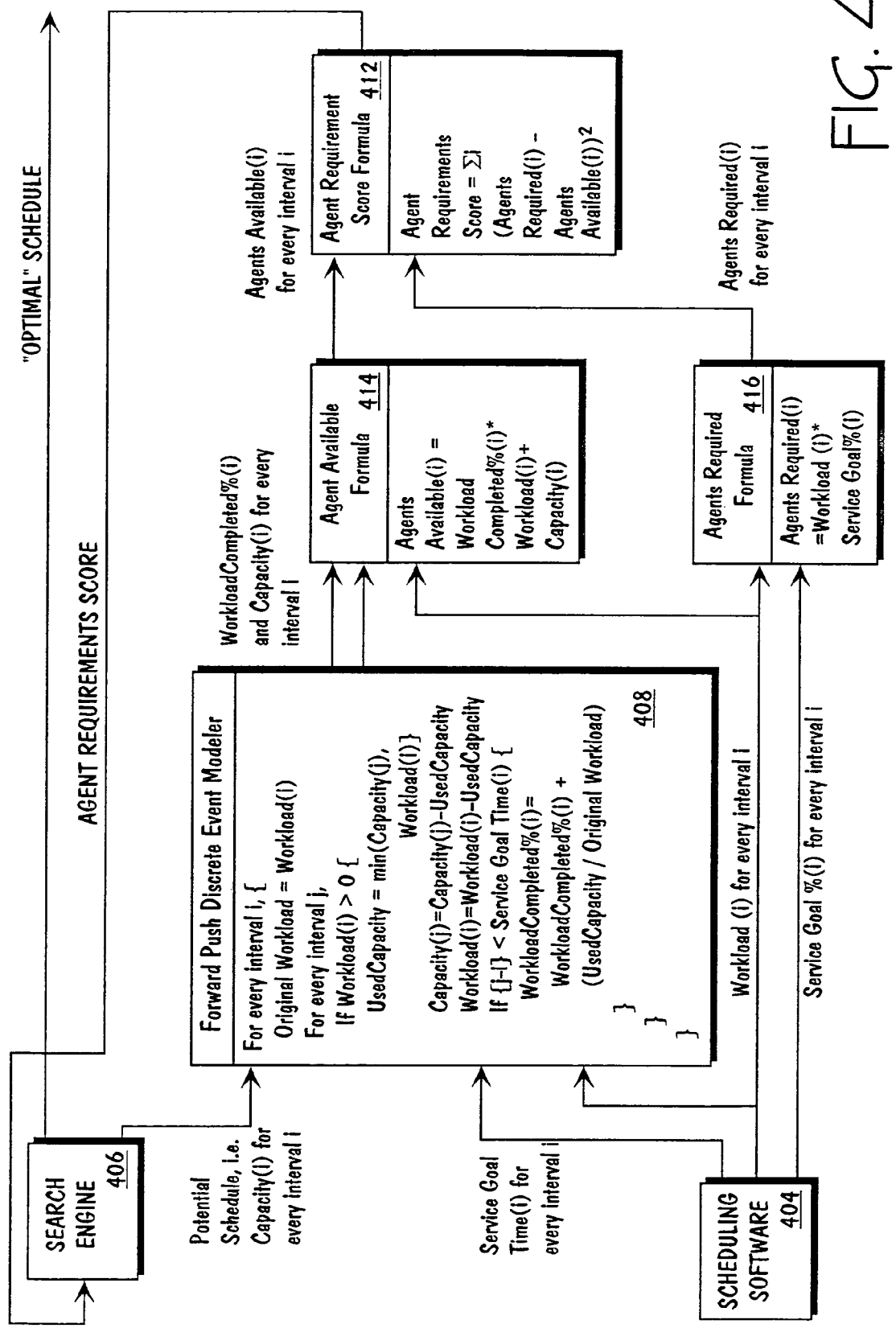
FIG. 4 is a more detailed flow diagram of an embodiment of a schedule analysis adapted to deferred queues.

FIG. 4 is a more detailed flow diagram showing the generation of an agent requirement score for deferred queues. The deferred queue analysis 408 is a forward push discrete event modeler. The forward push discrete event modeler 408 receives a potential schedule from the search engine 406. The potential schedule includes capacity for every interval in the schedule period. The forward push discrete event modeler 408 also receives a service goal expressed as time for every interval in the schedule period and a workload for every interval in the schedule period. The forward push event modeler iterates as shown at 408 and as previously described. The agents available formula 414 receives a workload completed percentage for every interval in the schedule period and a capacity for every interval in the schedule period. The agents available formula 414 also receives an agents required figure for every interval which is generated by the agents required formula 416. The agents available formula generates an agents available figure for every interval.

The agents required formula generates the agents required figure from the workload for every interval and the service goal for every interval. The agent requirement score formula 412 receives the agents available figure and the agents required figure and outputs an agent requirement score for the schedule period.

The invention has been described with reference to specific embodiments and examples. The scope of the invention is defined by the claims, and includes modifications that may be made by one of ordinary skill in the art.

The invention claimed is:

1. A method for generating a schedule for a multi-contact center, wherein the multi-contact center processes a plurality of contact queues, the method comprising:
   receiving a plurality of scheduling data from a user interface, wherein the plurality of scheduling data includes a plurality of contacts;
   categorizing the plurality of contacts as immediate contacts or deferred contacts, the immediate contacts being configured to be responded to within a first time period after receipt, the deferred contacts being configured to be responded to within a second time period after receipt, the second time period being longer than the first time period;
   assigning the plurality of contacts to a plurality of contact queues, the plurality of contact queues including an immediate contact queue and a deferred contact queue, the immediate contact queue comprising the immediate contacts, the deferred contact queue comprising the deferred contacts;
   generating a plurality of scheduling constraints;
   generating a plurality of potential schedules based on the plurality of scheduling constraints, the scheduling constraints including expected performance of the immediate contact queue and the deferred contact queue, at least one potential schedule being generated for at least one of the immediate contact queue and the deferred contact queue;
   performing an analysis on each of the plurality of potential schedules to generate estimated service levels for each of the plurality of contact queues, wherein an estimated service level comprises a percentage of incoming contacts responded to during a predetermined time;
   generating scores for each of the plurality of potential schedules based on the estimated service levels for each of the plurality of contact queues, wherein the scores indicate an effectiveness of the potential schedules; and
   selecting an optimal schedule from the plurality of potential schedules based on the scores for each of the plurality of potential schedules.

2. The method of claim 1, wherein the plurality of scheduling data further comprises at least one of:
   at least one contact type, comprising at least one of telephone calls, email, fax, web chat, voice over internet protocol, and call backs;
   at least one forecast contact volume;
   at least one forecast contact handling time;
   at least one service goal;
   at least one agent designation; and
   at least one work rule.

3. The method of claim 1, wherein the plurality of scheduling constraints comprises at least one of:
   a service goal time for each interval in a multi-interval schedule period;
   a workload for each interval in the multi-interval schedule period; and
   a service goal percentage for each interval in the multi-interval schedule period.

4. The method of claim 1, wherein the immediate contacts include telephone calls and the deferred contacts include email and fax.

5. The method of claim 1, wherein the immediate contacts are configured to be abandoned from the plurality of contact queues and the deferred contacts are configured to not be abandoned from the plurality of contact queues.

6. A system for generating a schedule for a multi-contact center, wherein the multi-contact center processes a plurality of contact queues, the system comprising:
   at least one server comprising at least one storage device; and
   at least one client processor being coupled to the at least one server through a network, the at least one client processor being coupled to a plurality of storage devices, including a storage device that stores instructions that, when executed, cause the at least one client processor to:
      receive a plurality of scheduling data from a user interface, the plurality of scheduling data including a plurality of contacts, categorize the plurality of contacts as immediate contacts or deferred contacts, the immediate contacts being configured to be responded to within a first time period after receipt, the deferred contacts being configured to be responded to within a second time period after receipt, the second time period being longer than the first time period, assign the plurality of contacts to the plurality of contact queues, including an immediate contact queue and a deferred contact queue, the immediate contact queue comprising the immediate contacts, the deferred contact queue comprising the deferred contacts, generate a plurality of scheduling constraints, generate a plurality of potential schedules based on the plurality of scheduling constraints, the scheduling constraints including expected performance of the immediate contact queue and the deferred contact queue, at least one potential schedule being generated for at least one of the immediate contact queue and the deferred contact queue, perform an analysis on each of the plurality of potential schedules to generate estimated service levels for each of the plurality of contact queues, wherein an estimated service level comprises a percentage of incoming contacts responded to during a predetermined time, generate scores for each of the plurality of potential schedules based on the estimated service levels for each of the plurality of contact queues, wherein the scores indicate an effectiveness of the potential schedules, and select an optimal schedule from the plurality of potential schedules based on the scores for each of the plurality of potential schedules.

7. The system of claim 6, wherein the storage device that stores the instructions is accessed by the at least one processor on the network.

8. The system of claim 6, wherein the storage device that stores the instructions is the at least one storage device of the server.

9. The system of claim 6, wherein the plurality of scheduling data comprises at least one of:
at least one contact type, comprising at least one of telephone calls, email, fax, web chat, voice over internet protocol, and call backs;
at least one forecast contact volume;
at least one forecast contact handling time;
at least one service goal;
at least one agent designation; and
at least one work rule.

10. The system of claim 6, wherein the plurality of scheduling constraints comprises at least one of:
a service goal time for each interval in a multi-interval schedule period;
a workload for each interval in a multi-interval schedule period; and
a service goal percentage for each interval in the multi-interval schedule period.

11. The system of claim 6, wherein the immediate contacts include telephone calls and the deferred contacts include email and fax.

12. A method for generating a schedule for a multi-contact center comprising:
receiving a plurality of scheduling data from a user interface, wherein the plurality of scheduling data includes a plurality of contacts;

categorizing the plurality of contacts as immediate contacts or deferred contacts, the immediate contacts being configured to be responded to within a first time period after receipt, the deferred contacts being configured to be responded to within a second time period after receipt;

assigning the plurality of contacts to a plurality of contact queues, the plurality of contact queues including an immediate contact queue and a deferred contact queue, the immediate contact queue comprising the immediate contacts, the deferred contact queue comprising the deferred contacts;

generating a plurality of scheduling constraints;

generating a plurality of potential schedules based on the plurality of scheduling constraints, the scheduling constraints including expected performance of the immediate contact queue and the deferred contact queue, at least one potential schedule being generated for each of the plurality of contact queues;

performing an analysis on each of the plurality of potential schedules to generate estimated service levels for each of the plurality of contact queues, wherein an estimated service level comprises a percentage of incoming contacts responded to during a predetermined time;

generating scores for each of the plurality of potential schedules based on the estimated service levels for each of the plurality of contact queues, wherein the scores indicate an effectiveness of the potential schedules; and selecting an optimal schedule from the plurality of potential schedules based on the scores for each of the plurality of potential schedules.

13. The method of claim 12, wherein the plurality of scheduling data further comprises at least one of:
at least one contact type, comprising at least one of telephone calls, email, fax, web chat, voice over internet protocol, and call backs;
at least one forecast contact volume;
at least one forecast contact handling time;
at least one service goal;
at least one agent designation; and
at least one work rule.

14. The method of claim 12, wherein the plurality of scheduling constraints comprises at least one of:
a service goal time for each interval in a multi-interval schedule period;
a workload for each interval in the multi-interval schedule period; and
a service goal percentage for each interval in the multi-interval schedule period.

15. The method of claim 14, wherein the analysis comprises generating the estimated service levels using a workload for each interval in the multi-interval schedule period, and a capacity for each interval in the multi-interval schedule period.

16. The method of claim 15, wherein the workload is generated by multiplying a forecast contact volume with a forecast average contact handling time.

17. The method of claim 15, wherein the capacity for an interval is generated by multiplying a number of available agents with a number of seconds that the number of available agents works on a contact queue.

18. The method of claim 17, wherein the analysis further comprises iterating over successive intervals in the multi-interval schedule period in chronological order until a total capacity for the multi-interval schedule period is used or a total workload for the multi-interval schedule period is completed, wherein iterating comprises:

applying a capacity for a first interval to a workload of the first interval; and if the workload of the first interval is not completed by the capacity for the first interval, applying a capacity for a subsequent interval to the workload of the first interval.

19. The method of claim 12, wherein the immediate contacts include telephone calls and the deferred contacts include email and fax.

20. The method of claim 12, wherein the immediate contacts are configured to be abandoned from the plurality of contact queues and the deferred contacts are configured to not be abandoned from the plurality of contact queues.

* * * * *